(12) United States Patent
Teruyama

(10) Patent No.: US 9,876,534 B2
(45) Date of Patent: *Jan. 23, 2018

(54) COMMUNICATION APPARATUS, COMMUNICATION METHOD, AND PROGRAM FOR EXCHANGING DATA WITH A TARGET

(71) Applicant: Sony Corporation, Tokyo (JP)

(72) Inventor: Katsuyuki Teruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,525

(22) Filed: May 27, 2016

(65) Prior Publication Data

US 2016/0277072 A1 Sep. 22, 2016

Related U.S. Application Data

(63) Continuation of application No. 14/642,074, filed on Mar. 9, 2015, now Pat. No. 9,356,657, which is a
(Continued)

(30) Foreign Application Priority Data

Nov. 29, 2010 (JP) ................. 2010-264716

(51) Int. Cl.
H04B 5/00 (2006.01)
H04W 4/00 (2009.01)
H04L 29/06 (2006.01)

(52) U.S. Cl.
CPC ............ *H04B 5/0031* (2013.01); *H04W 4/00* (2013.01); *H04W 4/001* (2013.01); *H04W 4/008* (2013.01); *H04L 69/24* (2013.01)

(58) Field of Classification Search
CPC .............................. G06F 9/45512; H04L 29/06
(Continued)

(56) References Cited

U.S. PATENT DOCUMENTS

| 4,451,884 A | 5/1984 | Heath et al. |
| 2006/0136570 A1 | 6/2006 | Pandya |

(Continued)

FOREIGN PATENT DOCUMENTS

| JP | 09-171546 A | 6/1997 |
| JP | 2009-515250 A | 4/2009 |

OTHER PUBLICATIONS

Mar. 15, 2012 Extended European Search Report issued in European Application No. 11190066.8.
(Continued)

*Primary Examiner* — Andy Ho
(74) *Attorney, Agent, or Firm* — Oblon, McClelland, Maier & Neustadt, L.L.P.

(57) ABSTRACT

A communication device includes a first processing unit that detects a target and receives a first command for activating an interface upon a detection of the target. The communication device also includes a second processing unit that exchanges data with the target through the first processing unit. Further, the communication device includes an interface between the first processing unit and the second processing unit. The first processing unit selects a predetermined interface level from among a plurality of interface levels based on the first command and exchanges data with the second processing unit based on the predetermined interface level.

40 Claims, 15 Drawing Sheets

Related U.S. Application Data continuation of application No. 14/204,626, filed on Mar. 11, 2014, now Pat. No. 8,997,119, which is a continuation of application No. 13/301,321, filed on Nov. 21, 2011, now Pat. No. 8,713,585.

(58) Field of Classification Search
USPC .......................................... 719/320; 709/230
See application file for complete search history.

(56) References Cited

U.S. PATENT DOCUMENTS

| | | |
|---|---|---|
| 2007/0263595 A1 | 11/2007 | Charrat |
| 2007/0263596 A1 | 11/2007 | Charrat |
| 2008/0288958 A1 | 11/2008 | Ryoo et al. |
| 2010/0169686 A1 | 7/2010 | Ryoo et al. |
| 2012/0045989 A1 | 2/2012 | Suumäki et al. |
| 2012/0135693 A1 | 5/2012 | Teruyama |
| 2012/0309302 A1 | 12/2012 | Buhot |
| 2013/0231048 A1 | 9/2013 | Hirsch |

OTHER PUBLICATIONS

Jun. 26, 2014 Office Action issued in Japanese Patent Application No. 2010-264716.
Combined Chinese Office Action and Search Report dated Feb. 3, 2015 in Patent Application No. 201110386172.3 (with English language translation).
Extended European Search Report dated May 31, 2016 in Patent Application No. 16155667.5.
Office Action dated May 17, 2017 in Korean Patent Application No. 10-2011-0121758 (with English language translation).

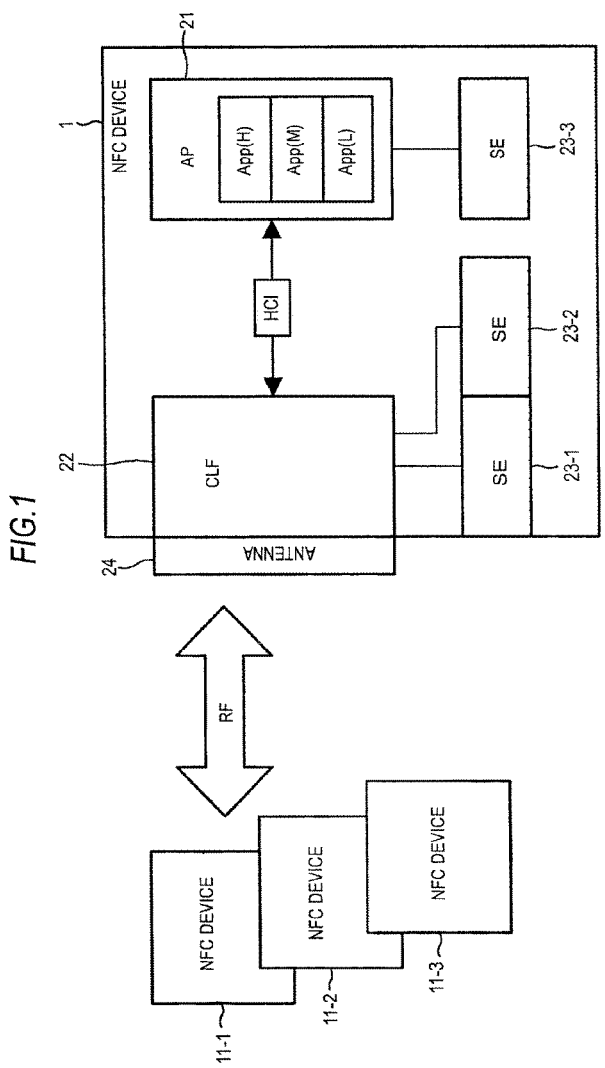

FIG.2

| RF PROTOCOL | INTERFACE LEVEL |
|---|---|
| (1) TYPE 1 TAG PLATFORM Protocol (based on NFC-A) | LOW LEVEL |
| (2) TYPE 2 TAG PLATFORM Protocol (based on NFC-A) | LOW LEVEL |
| (3) TYPE 3 TAG PLATFORM Protocol (based on NFC-F) | LOW LEVEL |
| (4) ISO-DEP Protocol (ISO/IEC 14443-4 based on NFC-A or NFC-B) / TYPE 4 TAG PLATFORM Protocol (based on NFC-A or NFC-B) | LOW/MIDDLE/HIGH LEVEL |
| (5) NFC-DEP Protocol (ISO/IEC 18092 transport protocol based on NFC-A or NFC-F) | LOW/MIDDLE/HIGH LEVEL |
| (6) PROPRIETARY DEFINITION PROTOCOL | LOW LEVEL |

FIG.4

INIT_COM (HCI VERSION, HCI FEATURES):INITIALIZATION COMMAND

| PARAMETER | DESCRIPTION |
|---|---|
| HCI VERSION | HCI VERSION OF AP |
| HCI FEATURES | ABILITY OF AP |

INIT_RES(STATUS, HCI VERSION, HCI FEATURES, HCI INTERFACES):INITIALIZATION RESPONSE

| PARAMETER | DESCRIPTION |
|---|---|
| STATUS | RESPONSE WITH RESPECT TO COMMAND(1:OK,0:NG) |
| HCI VERSION | HCI VERSION OF CLF |
| HCI FEATURES | ABILITY OF CLF |
| HCI INTERFACES | INTERFACE ABILITY OF CLF |

FIG.5

SET_INTERFACE_LEVEL_COM (NUMBER OF INTERFACE LEVEL SETTING DATA ITEMS, INTERFACE LEVEL SETTING DATA [1],...., INTERFACE LEVEL SETTING DATA [n]): INTERFACE LEVEL SETTING COMMAND

| PARAMETER | DESCRIPTION |
|---|---|
| NUMBER OF INTERFACE LEVEL SETTING DATA ITEMS | NUMBER OF INTERFACE LEVEL SETTING DATA ITEMS (n) |
| INTERFACE LEVEL SETTING DATA [1] | FIRST INTERFACE LEVEL SETTING DATA ITEM [1] |
| .. | |
| INTERFACE LEVEL SETTING DATA [n] | n-TH INTERFACE LEVEL SETTING DATA [n] |

INTERFACE LEVEL SETTING DATA(MODE,PROTOCOL,INTERFACE LEVEL)

| DATA | DESCRIPTION |
|---|---|
| MODE(POLL/LISTEN) | MODE OF TARGET |
| PROTOCOL | USED RF PROTOCOL |
| INTERFACE LEVEL | USED INTERFACE LEVEL |

SET_INTERFACE_LEVEL_RES(STATUS):INTERFACE LEVEL SETTING RESPONSE

| PARAMETER | DESCRIPTION |
|---|---|
| STATUS | RESPONSE WITH RESPECT TO COMMAND(1:OK,0:NG) |

FIG.6

DISCOVER_START_COM(DISCOVERY TYPE[1],...DISCOVERY TYPE[n]):DISCOVERY START COMMAND

| PARAMETER | DESCRIPTION |
|---|---|
| DISCOVERY TYPE[1] | RF TECHNOLOGY OF DETECTION TARGET |
| .. | |
| DISCOVERY TYPE[n] | RF TECHNOLOGY OF DETECTION TARGET |

DISCOVER_START_RES(STATUS):DISCOVERY START RESPONSE

| PARAMETER | DESCRIPTION |
|---|---|
| STATUS | RESPONSE WITH RESPECT TO COMMAND(1:OK,0:NG) |

DISCOVER_STOP_COM:DISCOVERY STOP COMMAND

| PARAMETER | DESCRIPTION |
|---|---|
| NONE | |

DISCOVER_STOP_RES(STATUS):DISCOVERY STOP RESPONSE

| PARAMETER | DESCRIPTION |
|---|---|
| STATUS | RESPONSE WITH RESPECT TO COMMAND(1:OK,0:NG) |

FIG.7

DISCOVER_SELECT_COM(TARGET ID, TARGET SAP):DISCOVERY SELECT COMMAND

| PARAMETER | DESCRIPTION |
|---|---|
| TARGET ID | IDENTIFIER ALLOTTED TO RF TECHNOLOGY (TARGET) |
| TARGET SAP | IDENTIFIER ALLOTTED TO RF PROTOCOL |

DISCOVER_SELECT_RES(STATUS):DISCOVERY SELECT RESPONSE

| PARAMETER | DESCRIPTION |
|---|---|
| STATUS | RESPONSE WITH RESPECT TO COMMAND(1:OK, 0:NG) |

DEACT_COM(TARGET ID, TARGET SAP, DEACTIVATION TYPE):DEACTIVATION COMMAND

| PARAMETER | DESCRIPTION |
|---|---|
| TARGET ID | IDENTIFIER ALLOTTED TO RF TECHNOLOGY (TARGET) |
| TARGET SAP | IDENTIFIER ALLOTTED TO RF PROTOCOL |
| DEACTIVATION TYPE | DEACTIVATION TYPE (COMMAND SENT TO TARGET) |

DEACT_RES(STATUS):DEACTIVATION RESPONSE

| PARAMETER | DESCRIPTION |
|---|---|
| STATUS | RESPONSE WITH RESPECT TO COMMAND(1:OK, 0:NG) |

FIG.8

DISCOVER_NTF(TARGET ID,TARGET SAP,DISCOVERY TYPE,RF PROTOCOL,TECHNOLOGY SPECIFIC PARAMETERS,MORE):DISCOVERY NOTIFICATION

| PARAMETER | DESCRIPTION |
|---|---|
| TARGET ID | IDENTIFIER ALLOTTED TO RF TECHNOLOGY (REMOTE TARGET) |
| TARGET SAP | IDENTIFIER ALLOTTED TO RF PROTOCOL |
| DISCOVERY TYPE | DETECTED RF TECHNOLOGY |
| RF PROTOCOL | RF PROTOCOL OF REMOTE TARGET |
| TECHNOLOGY SPECIFIC PARAMETERS | RF TECHNOLOGY SPECIFIC PARAMETER |
| MORE | PRESENCE OF NEXT DISCOVER_NTF (1: PRESENT, 0: ABSENT) |

ACT_NTF(TARGET ID,TARGET SAP,DISCOVERY TYPE,RF PROTOCOL,ACTIVATION PARAMETERS, INTERFACE TYPE):ACTIVATION NOTIFICATION

| PARAMETER | DESCRIPTION |
|---|---|
| TARGET ID | IDENTIFIER ALLOTTED TO RF TECHNOLOGY (REMOTE TARGET) |
| TARGET SAP | IDENTIFIER ALLOTTED TO RF PROTOCOL |
| DISCOVERY TYPE | DETECTED RF TECHNOLOGY |
| RF PROTOCOL | RF PROTOCOL OF REMOTE TARGET |
| ACTIVATION PARAMETERS | ACTIVATION PARAMETER |
| INTERFACE TYPE | ACTIVATED INTERFACE LEVEL |

DEACT_NTF(TARGET ID,TARGET SAP,DEACTIVATION PARAMETERS):DEACTIVATION NOTIFICATION

| PARAMETER | DESCRIPTION |
|---|---|
| TARGET ID | IDENTIFIER ALLOTTED TO RF TECHNOLOGY (REMOTE TARGET) |
| TARGET SAP | IDENTIFIER ALLOTTED TO RF PROTOCOL |
| DEACTIVATION PARAMETERS | DEACTIVATION PARAMETER |

FIG.9

| COMMAND | | DESCRIPTION |
|---|---|---|
| INIT_COM | INITIALIZATION COMMAND | INITIALIZATION OF HCI AND ABILITY EXCHANGE BETWEEN CLF AND AP ARE PERFORMED |
| INIT_RES | INITIALIZATION RESPONSE | RESPONSE WITH RESPECT TO INITIALIZATION COMMAND |
| SET_INTERFACE_LEVEL_COM | INTERFACE LEVEL SETTING COMMAND | CORRESPONDENCE RELATIONSHIP BETWEEN RF PROTOCOL AND INTERFACE LEVEL IS MADE |
| SET_INTERFACE_LEVEL_RES | INTERFACE LEVEL SETTING RESPONSE | RESPONSE WITH RESPECT TO INTERFACE LEVEL SETTING COMMAND |
| DISCOVER_START_COM | DISCOVERY START COMMAND | TARGET DETECTION START IS REQUESTED |
| DISCOVER_START_RES | DISCOVERY START RESPONSE | RESPONSE WITH RESPECT TO DISCOVERY START COMMAND |
| DISCOVER_STOP_COM | DISCOVERY STOP COMMAND | TARGET DETECTION STOP IS REQUESTED |
| DISCOVER_STOP_RES | DISCOVERY STOP RESPONSE | RESPONSE WITH RESPECT TO DISCOVERY STOP COMMAND |
| DISCOVER_SELECT_COM | DISCOVERY SELECTION COMMAND | TARGET, RF TECHNOLOGY, AND RF PROTOCOL ARE SELECTED |
| DISCOVER_SELECT_RES | DISCOVERY SELECTION RESPONSE | RESPONSE WITH RESPECT TO DISCOVERY SELECTION COMMAND |
| DEACT_COM | DEACTIVATION COMMAND | COMPLETION OF DATA EXCHANGE WITH TARGET IS REQUESTED |
| DEACT_RES | DEACTIVATION RESPONSE | RESPONSE WITH RESPECT TO DEACTIVATION COMMAND |
| DISCOVER_NTF | DISCOVERY NOTIFICATION | NOTIFICATION IS MADE FOR TARGET, RF TECHNOLOGY, AND RF PROTOCOL |
| ACT_NTF | ACTIVATION NOTIFICATION | NOTIFICATION IS MADE FOR ACTIVATION OF SPECIFIC INTERFACE LEVEL |
| DEACT_NTF | DEACTIVATION NOTIFICATION | NOTIFICATION IS MADE FOR DEACTIVATION OF SPECIFIC INTERFACE LEVEL |

FIG.11

|  | RF TECHNOLOGY | RF PROTOCOL | TARGET ID | TTARGET SAP |
|---|---|---|---|---|
| TARGET 11-1 | NFC-A | ISO-DEP<br>NFC-DEP | TID1 | TSAP1 → TSAP4<br>→ TSAP5 |
| TARGET 11-2 | NFC-B | ISO-DEP | TID2 | TSAP2 |
| TARGET 11-3 | NFC-F | T3T | TID3 | TSAP3 |

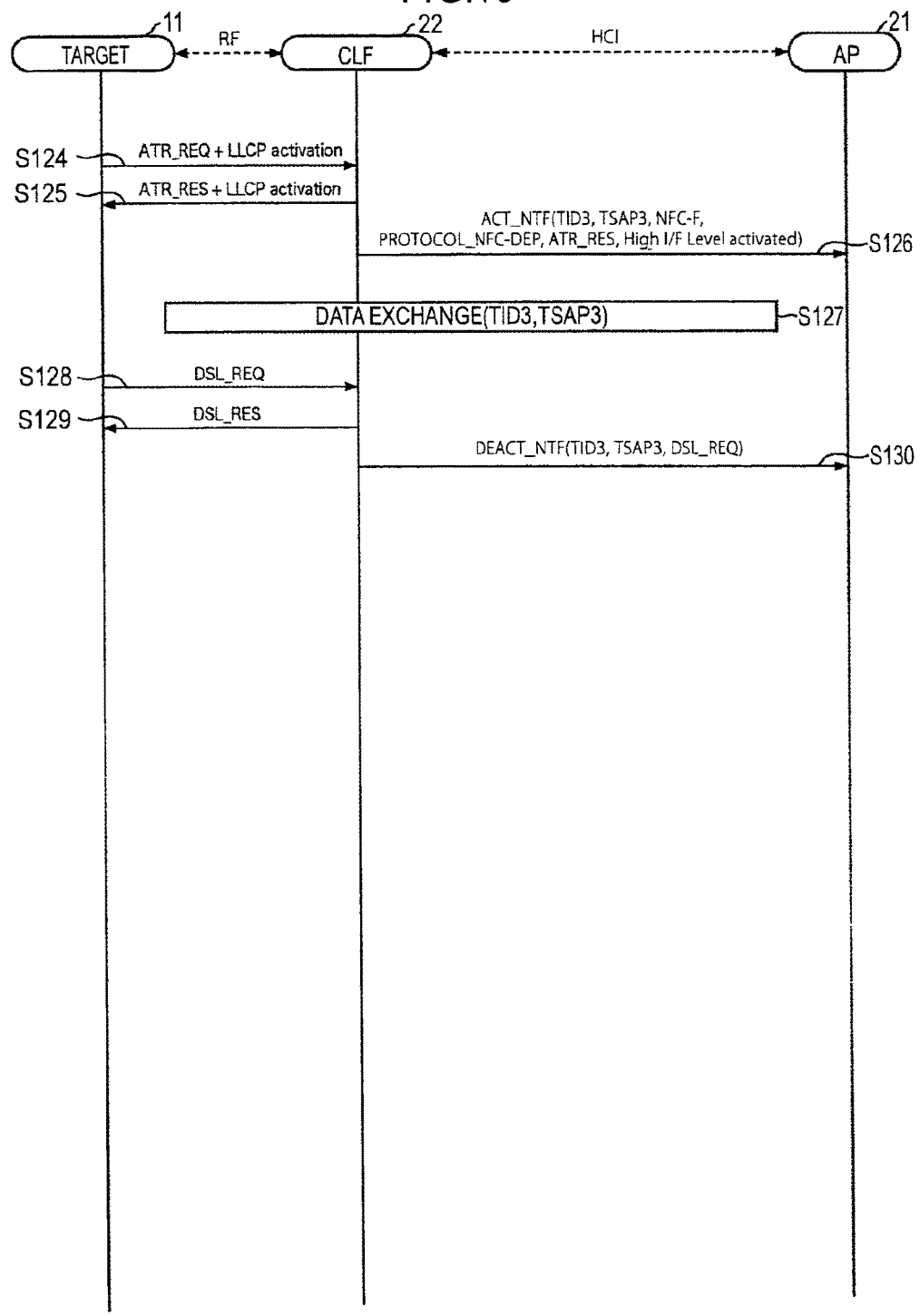

COMMUNICATION APPARATUS, COMMUNICATION METHOD, AND PROGRAM FOR EXCHANGING DATA WITH A TARGET

CROSS-REFERENCE TO RELATED APPLICATIONS

This application is a continuation of U.S. application Ser. No. 14/642,074, filed Mar. 9, 2015, (issued as U.S. Pat. No. 9,356,657), which is a continuation of U.S. application Ser. No. 14/204,626 filed Mar. 11, 2014, (issued as U.S. Pat. No. 8,997,119), which is a continuation of U.S. application Ser. No. 13/301,321 filed Nov. 21, 2011 (issued as U.S. Pat. No. 8,713,585), and claims priority from Japanese Patent Application JP 2010-264716 filed Nov. 29, 2010, the entire contents of which are hereby incorporated by reference.

FIELD

The present disclosure relates to a communication apparatus, a communication method, and a program, and particularly to a communication apparatus, a communication method and a program by each of which it is possible to provide an interface which can be compatible with a case in which a plurality of types of targets and protocols are detected.

BACKGROUND

A near field communication system for performing wireless communication at close range in a non-contact manner with the use of an IC (Integrated Circuit) card is in widespread use. For example, the usage thereof as an electronic travel ticket and electronic money is well known. In addition, recently, a mobile phone with a function as an electronic travel ticket and electronic money by non-contact wireless communication has been becoming widespread.

The near field wireless communication system has rapidly become widespread worldwide and recognized as an international standard. Examples of the international standard include ISO/IEC 14443 as the standard of a proximity type IC card system, ISO/IEC 18092 as the standard of NFCIP (Near Field Communication Interface and Protocol)-1, and the like.

In the near field wireless communication based on ISO/IEC 18092, there are an active communication mode and a passive communication mode. The active communication mode is a communication mode in which data transmission is performed by outputting electromagnetic waves from each of a plurality of communication apparatuses exchanging data and modulating a respective electromagnetic wave. In the passive communication mode, data transmission is performed by outputting an electromagnetic wave from one (initiator) of the plurality of communication apparatuses and modulating the electromagnetic wave. The other communication apparatuses (targets) of the plurality of communication apparatuses send data by performing load modulation on the electromagnetic wave output from the initiator.

In the passive communication mode of ISO/IEC 18092 (hereinafter, referred to as type F), data encoding by Manchester coding is performed for the data transmission between a reader writer and an IC card. In addition, 212 kbps and 424 kbps (kilobits per second) are employed as data communication rates in the type F. The FeliCa (registered trademark) scheme by the applicant, Sony Corporation, corresponds to the type F.

In addition, there are various communication schemes, for example, called type A and type B in the IC card system based on ISO/IEC 14443.

The type A is employed as the MIFARE (registered trademark) by Koninklijke Philips Electronics N.V. In the type A, the data encoding by Miller coding is performed for the data transmission from the reader writer to the IC card while the data encoding by Manchester coding is performed for the data transmission from the IC card to the reader writer. In addition, 106 to 847 kbps (kilobit per second) is employed as the data communication rate in the type A.

In the type B, the data encoding by NRZ encoding is performed for the data transmission from the reader writer to the IC card while the data encoding by NRZ-L is performed for the data transmission from the IC card to the reader writer. In addition, 106 kbps is employed as the data communication rate in the type B.

The communication apparatus for the near field wireless communication based on ISO/IEC 18092 or ISO/IEC 14443 is referred to as an NFC device herein below. There are definitions of the protocol and the command to be exchanged between a CLF (Contactless Front end) and an AP (Application Processor) while the NFC device is functionally divided into the CLF and the AP (see JP-T-2009-515250). The CLF mainly performs transceiving of the RF data with a target (a PICC (IC card) of ISO/IEC 14443 or target of ISO/IEC 18092) while the AP mainly executes an application and performs overall control of the NFC device.

SUMMARY

However, JP-T-2009-515250 assumes only a case in which one kind of target and protocol are detected from among the type A and the type B of ISO/IEC 14443 and the type F of ISO/IEC 18092. In other words, JP-B-2009-515250 discloses an interface including the CLF and the AP on the assumption that only one kind of target and protocol is detected. For this reason, the interface is not for the case in which a plurality of kinds of targets and protocols are detected, and an interface including the CLF and the AP which can be compatible with a plurality of kinds of targets and the protocols is desired.

Thus, it is desirable to provide an interface which can be compatible with a case in which a plurality of kinds of targets and protocols are detected.

In one example, a communication device includes a first processing unit configured to detect a target and to receive a first command for activating an interface upon a detection of the target. The communication device also includes a second processing unit configured to exchange data with the target through the first processing unit. Further, the communication device includes an interface between the first processing unit and the second processing unit. The first processing unit is further configured to select a predetermined interface level from among a plurality of interface levels based on the first command and to exchange data with the second processing unit based on the predetermined interface level.

The predetermined interface level can be selected based on an RF protocol used in a communication between the target and the first processing unit.

The first processing unit can be further configured to transmit a second command and to receive a third command in response to the second command, the third command indicating the RF protocol.

The first processing unit can be further configured to receive from the second processing unit a fourth command, the fourth command associating the RF protocol with the predetermined interface level.

The first processing unit can be further configured to send a fifth command based on the first command, the fifth command indicating the predetermined interface level.

The first processing unit can be further configured to start and execute an application based on the predetermined interface level, the application exchanging data between the second processing unit and the target using the RF protocol.

In another example, the first processing unit can be further configured to receive a second command, to send a third command in response to the second command, and to receive the first command based on the third command.

In such an example, the first processing unit can be further configured to receive from the second processing unit a fourth command, the fourth command associating the RF protocol with the predetermined interface level.

Further to that example, the first processing unit can be further configured to send a fifth command in response to the first command, the fifth command indicating the predetermined interface level.

In a further example, the predetermined interface level can be selected based on an RF technology used in a communication between the target and the first processing unit.

According to such an example, the first processing unit can be further configured to transmit a second command and to receive a third command in response to the second command, the third command indicating the RF technology.

Additionally in that example, the first processing unit can be further configured to transmit a fourth command to the second processing unit, the fourth command indicating the RF technology.

Further to such an example, the first processing unit can be configured to start and execute an application based on the predetermined interface level, the application exchanging data between the first processing unit and the target using the RF technology.

Further to that example, the first processing unit can be configured to receive a second command, to send a third command in response to the second command, and to receive the first command based on the third command.

Additionally, in such an example, the first processing unit can be further configured to send a fourth command in response to the first command, the fourth command indicating the predetermined interface level.

In another example, the first processing unit can be further configured to receive a second command representing a version of the second processing unit, and the first processing unit can be further configured to transmit a third command in response to the second command, the second command representing a version of the first processing unit. When the version of the second processing unit is equivalent or higher than the version of the first processing unit, the interface exchanges messages.

In such an example, the third command also represents the predetermined interface level, and, when the version of the second processing unit is equivalent or higher than the version of the first processing unit, the second processing unit transmits the command, the command indicating at least one of a poll mode and a listen mode, an RF protocol, and an interface level.

In another example, a communication method includes detecting a target, and receiving, at a first processing unit, a first message for activating an interface upon the detecting. The communication method also includes exchanging data between a second processing unit and the target through the first processing unit. The communication method further includes selecting, with the first processing unit, a predetermined interface level from among a plurality of interface levels based on the first message. In addition, the communication method includes exchanging data between the first processing unit and the second processing unit based on the predetermined interface level.

According to another example, a non-transitory, computer-readable storage medium is encoded with computer executable instructions. The instructions, when executed by a communication device, cause the communication device to perform a method including detecting a target and receiving, at a first processing unit, a first message for activating an interface upon the detecting. The method also includes exchanging data between a second processing unit and the target through the first processing unit. Further, the method includes selecting, with the first processing unit, a predetermined interface level from among a plurality of interface levels based on the first message. In addition, the method includes exchanging data between the first processing unit and the second processing unit based on the predetermined interface level.

BRIEF DESCRIPTION OF THE DRAWINGS

FIG. 1 is a block diagram showing a configuration example of an embodiment of a communication system to which the present disclosure is applied;

FIG. 2 is a diagram showing an interface level settable for each RF protocol;

FIG. 4 is a diagram illustrating a detailed format of each message;

FIG. 5 is a diagram illustrating a detailed format of each message;

FIG. 6 is a diagram illustrating a detailed format of each message;

FIG. 7 is a diagram illustrating a detailed format of each message;

FIG. 8 is a diagram illustrating a detailed format of each message;

FIG. 9 is a diagram illustrating a detailed format of each message;

FIG. 11 is a flowchart illustrating a sequence outline;

FIG. 15 is a flowchart illustrating a detailed sequence example in the case of a Listen Mode.

DETAILED DESCRIPTION

Figure 3:
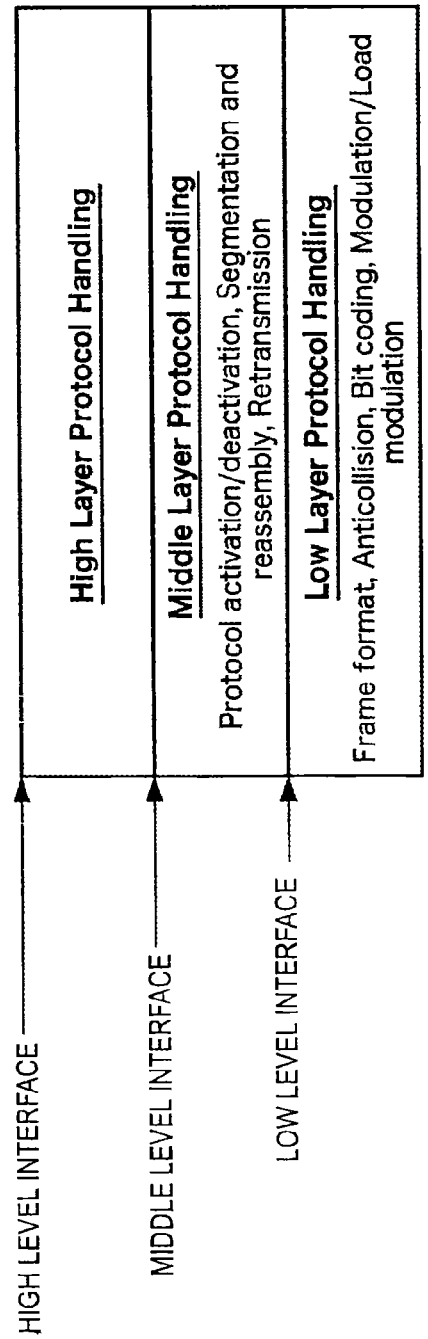
FIG. 3 is a diagram showing a difference in processing in accordance with an interface level in the case of a communication layer for P2P communication between NFC devices.

[Configuration Example of Communication System to which Present Disclosure is Applied]

FIG. 1 shows a configuration example of a communication system according to an embodiment to which the present disclosure is applied.

The communication system in FIG. 1 includes an NFC device 1 and NFC devices 11-1 to 11-3.

The NFC device 1 and the NFC devices 11-1 to 11-3 are communication apparatuses for near field wireless communication based on one or both of ISO/IEC 18092 and ISO/IEC 14443. The NFC device 1 and the NFC devices 11-1 to 11-3 can be operated as either of a polling device and a listening device.

The polling device forms a so-called RF (Radio Frequency) field (magnetic field) by generating an electromagnetic wave, sends a polling command to detect a listening device as a target, and waits for the response from the listening device. In other words, the polling device performs an operation of a PCD (Proximity Coupling Device) of ISO/IEC 14443 or an operation of an initiator in the passive mode of ISO/IEC 18092.

The listening device receives a polling command which is sent from the polling device by forming the RF field and then responds with a polling response. In other words, the listening device performs the operation of PICC of ISO/IEC 14443 or the operation of the target of ISO/IEC 18092.

Accordingly, the NFC device 1 and the NFC devices 11-1 to 11-3 may have the same hardware configurations, respectively.

The NFC devices 11-1 to 11-3 are respectively referred to as targets 11-1 to 11-3 hereinbelow to simplify the difference between the NFC device 1 and the NFC devices 11-1 to 11-3. In addition, when it is not particularly necessary to distinguish the targets 11-1 to 11-3, the targets 11-1 to 11-3 are simply referred to as a target 11 (or an NFC device 11).

The NFC device 1 includes one AP (Application Processor) 21, one CLF (Contactless Front end) 22, and 0 or more SEs (Secure Element) 23. Since 0 or more SEs 23 are provided, the number thereof may be 0 (the SE 23 may be omitted).

The AP 21 performs overall control of the NFC device 1, generates a command (CMD) for controlling the CLF 22, and analyzes an execution result with respect to the command. The AP is an example of a processing means. The AP 21 exchanges a message with the CLF 22 in accordance with the HCI (Host Controller Interface). In addition, the AP 21 executes an application for data exchange with the target 11. Examples of the application include an application which performs data exchange processing for name cards and an address book in the P2P (Peer-to-Peer) communication, electronic money payment processing, and the like between a reader writer and an IC card. In addition, the AP 21 stores therein three applications App (H), App (M), and App (L) with different levels as the applications for data exchange in accordance with the level of the interface of the CLF 22 (interface level).

Thus, the CLF 22 includes a memory. The memory can also be external to the CLF 22. The memory can be a ROM, a RAM, a magnetic disk, an optical disk, or any other memory.

Further, the memory is an example of a storing means. When the AP executes a program to perform a method according to some embodiments, the memory is an example of a non-transitory storage medium.

The CLF 22 is an interface which is disposed between the AP 21 and the target 11 to mediate therebetween and controls the path such that the AP 21 and the SE 23 can exchange data with the target 11. The CLF is an example of a processing means. The CLF 22 has a plurality of interface levels as the interface level for mediating the AP 21 and the target 11. In this embodiment, the CLF 22 is assumed to have three stages of interface levels including a low level, a middle level, and a high level. The CLF 22 is instructed by the HCI and exchanges messages with the AP 21 and performs transceiving of RF data through an antenna 24 based on a command (CMD) from the AP 21.

The HCI is a logical interface between the AP 21 and the CLF 22, and a command (CMD) and a notification (NTF) in a predetermined format which will be described later are defined in the HCI.

The SE 23 performs processing and retaining of secure data from among the processing which are necessary for the data exchange between the NFC device 1 and the target 11. In the example of FIG. 1, three SEs 23-1 to 23-3 are provided in the NFC device 1. The SEs 23-1 and 23-2 are connected to the CLF 22 to perform retaining and processing of secure data which is treated by the CLF 22 while the SE 23-3 is connected to the AP 21 to perform retaining and processing of secure data which is treated by the AP 21. It is possible to provide a necessary number of SEs 23 in the NFC device 1 or omit the SEs 23 if it is not necessary.

The antenna 24 constitutes a closed-loop coil and outputs an electromagnetic wave (RF data) if the current flowing through the coil changes. The antenna is an example of a transmitting means and/or a receiving means.

The NFC device 1 configured as described above supports one or more of the following three RF technologies.
(1) NFC-A . . . Type A communication scheme of ISO/IEC 14443
(2) NFC-B . . . Type B communication scheme of ISO/IEC 14443
(3) NFC-F . . . 212 kbps and 424 kbps communication schemes of ISO/IEC 18092

The NFC-A is an abbreviated expression of Type A of ISO/IEC 14443, the NFC-B is an abbreviated expression of Type B of ISO/IEC 14443, and the NFC-F is an abbreviated expression of 212 kbps and 424 kbps communication schemes of ISO/IEC 18092, in this specification.

In addition, the NFC device 1 supports one or more of the following six RF protocols.
(1) T1T . . . TYPE 1 TAG PLATFORM Protocol (based on Type NFC-A)
(2) T2T . . . TYPE 2 TAG PLATFORM Protocol (based on Type NFC-A)
(3) T3T . . . TYPE 3 TAG PLATFORM Protocol (based on Type NFC-F)
(4) ISO-DEP . . . ISO-DEP Protocol (ISO/IEC 14443-4 based on Type NFC-A or NFC-B)/TYPE 4 TAG PLATFORM Protocol (based on Type NFC-A or NFC-B)
(5) NFC-DEP . . . NFC-DEP Protocol (ISO/IEC 18092 transport protocol based on NFC-A or NFC-F)
(6) Prop . . . Proprietary Definition Protocol (Proprietary Protocol)

The T1T is an abbreviated expression of TYPE 1 TAG PLATFORM Protocol (based on NFC-A), and the T2T is an abbreviated expression of TYPE 2 TAG PLATFORM Protocol (based on NFC-A), in this specification. The same is true for the T3T, the ISO-DEP, the NFC-DEP, and the Prop.

[Concerning Interface Level]

When the NFC device 1 exchanges data with the target 11, the NFC device 1 can allot processing to the AP 21 and the CLF 22. In other words, it is possible to cause the intermediate CLF 22 to perform processing which is necessary for the data exchange with the target 11 instead of the AP 21. At this time, to which level the CLF 22 performs the processing necessary for the data exchange instead is determined based on the interface level designated (notified) from the AP 21 to the CLF 22.

From among the three stages of interface levels including a low level, a middle level, and a high level of the CLF 22, the high level is a level at which the amount of processing allotted to the CLF 22 as an interface is the largest, and the low level is a level at which the amount of processing allotted to the CLF 22 as an interface is the smallest. It is necessary to set the interface level for each RF protocol, and a settable interface level is set in advance depending on the RF protocol in the CLF 22.

FIG. 2 shows the interface level which can be set for the RF protocol by the CLF 22.

Only a low interface level can be set for each of the RF protocols T1T, T2T, and T3T. In addition, the RF technology when the RF protocol is T1T and T2T is NFC-A, and the RF technology when the RF protocol is T3T is NFC-F.

It is possible to set any of the interface levels from among the low level, the middle level, and the high level for each of the RF protocols ISO-DEP and NFC-DEP. The RF technology when the RF protocol is ISO-DEP is NFC-A or NFC-B, and the RF technology when the RF protocol is NFC-DEP is NFC-A or NFC-F.

Only the low interface level can be set for the RF protocol Prop.

FIG. 3 shows a difference in processing depending on the interface level in the case of a communication layer for the P2P communication between NFC devices.

At the low interface level, the CLF 22 has functions of Frame format, Anticollision, Bit coding, and Modulation/Load modulation based on ISO/IEC 18092. At the middle interface level, the CLF 22 further has functions up to a transport protocol based on ISO/IEC 18092. That is, the CLF 22 further has functions of Protocol activation/deactivation, Segmentation and reassembly, and Retransmission as well as the functions at the low level. At the high interface level, the CLF 22 has functions up to LLCP (NFC Forum Logical Link Control Protocol) which is a higher layer protocol of transport protocol based on ISO/IEC 18092.

It is possible to set and mount the interface level of the CLF 22 for each RF protocol from among the three stages in accordance with the application conditions, the costs of the IC chips, and the like which are assumed by the CLF 22.

In initial processing, the CLF 22 notifies the AP 21 of the information regarding up to which interface level the CLF 22 itself supports. The AP 21 grasps the interface level supported by the CLF 22, selects an optimal interface level from among the interface levels supported by the CLF 22 in accordance with the application conditions assumed by the AP 21, and designates the interface level for the CLF 22. When the CLF 22 supports all interface levels, the AP 21 can select an optimal interface level in accordance with the processing supported by the application. For example, when it is desired that the AP 21 executes an application with less processing, the AP 21 may select and designate the high interface level for the CLF 22.

[Message Format]

Next, detailed description will be made of a message defined as an HCl with reference to FIGS. 4 to 9.

There are three kinds of messages including a CMD (command) from the AP 21 to the CLF 22, an RSP (response) from the CLF 22 to the AP 21 for the command, and an NTF (notification) from the CLF 22 to the AP 21.

FIG. 4 shows formats for an initialization command "INIT_COM" and an initialization response "INIT_RES".

The initialization command "INIT_COM" is a message for initialization of the HCl and the ability exchange between the CLF 22 and the AP 21. The initialization command "INIT_COM" includes "Version" representing the HCl version (version number) of the AP 21 and "HCl Features" representing the ability of the AP 21 as parameters. The information regarding the communication control functions supported by the AP 21 such as information regarding the presence of a flow control function, a card emulation function, an additional message creation function, and the like is input in "HCl Features".

The initialization response "INIT_RES" is a message for responding to the initialization command. The initialization response "INIT_RES" includes "Status" representing the response result for the initialization command "INIT_COM", "Version" representing the HCl version of the CLF 22, "HCl Features" representing the ability of the CLF 22, and "HCl Interfaces" representing the interface ability of the CLF 22 as parameters. The information regarding the communication control functions supported by the CLF 22 such as information regarding the presence of a flow control function, a battery OFF mode function, a routing function with the use of an application identifier of card emulation, and the like is input in "HCl Features". The interface level for each RF protocol supported by the CLF 22 is input in "HCl Interfaces".

The AP 21 and the CLF 22 mutually check the versions thereof by the initialization command "INIT_COM" and the initialization response "INIT_RES", and it is possible to exchange messages while being instructed by the HCl if the version of the AP 21 is equivalent or higher than the version of the CLF 22. On the other hand, if the version of the AP 21 is lower than the version of the CLF 22, the AP 21 performs error processing such as an output of an error message.

FIG. 5 shows formats for the interface level setting command "SET_INTERFACE_LEVEL_COM" and the interface level setting response "SET_INTERFACE_LEVEL_RES".

The interface level setting command "SET_INTERFACE_LEVEL_COM" is a message for associating the RF protocol and the interface level. The interface level setting command "SET_INTERFACE_LEVEL_COM" includes the number [n] of interface level setting data items and n interface level setting data items.

The interface level setting data for one RF protocol includes "Mode" representing the mode (Poll mode/Listen Mode) of the target 11, "Protocol" representing the used RF protocol, and "Interface level" representing the used interface level. That is, it is possible to set the interface level ("Interface level") for each of the Poll Mode and the Listen Mode for one RF protocol ("Protocol"). For example, setting can be made such that the middle interface level is set for the case of the Poll Mode when the RF protocol is ISO-DEP and the high interface level is set for the case of the Listen Mode when the RF protocol is ISO-DEP. Accordingly, the number n of the interface level setting data items becomes twice as large as the number of the RF protocols at a maximum.

The interface level setting response "SET_INTERFACE_LEVEL_RES" is a message for responding to the interface level setting command. The interface level setting response "SET_INTERFACE_LEVEL_RES" includes OK=1, or NG=0, which represents the response result, as a parameter.

FIG. 6 shows formats for the discovery start command "DISCOVER_START_COM", the discovery start response "DISCOVER_START_RES", the discovery stop command "DISCOVER_STOP_COM" and the discovery stop response "DISCOVER_STOP_RES".

The discovery start command "DISCOVER_START_COM" is a message for requesting the start of the detection of the target 11. The parameter of the discovery start command "DISCOVER_START_COM" includes "Discovery Types" representing the RF technologies as detection targets, the number of which corresponds to the number of the RF technologies which are desired to be detected.

The discovery start response "DISCOVER_START_RES" is a message for responding to the discovery start command. The discovery start response "DISCOVER_START_RES" includes OK=1 or NG=0, which represents the response result, as a parameter.

The discovery stop command "DISCOVER_STOP_COM" is a message for requesting the detection of the target 11 to be stopped. The discovery stop command "DISCOVER_STOP_COM" does not include any parameters.

The discovery stop response "DISCOVER_STOP_RES" is a message for responding to the discovery stop command. The discovery stop response "DISCOVER_STOP_RES" includes OK=1 or NG=0, which represents the response result, as a parameter.

FIG. 7 shows formats for the discovery selection command "DISCOVER_SELECT_COM", the discovery selection response "DISCOVER_SELECT_RES", the deactivation command "DEACT_COM", and the deactivation response "DEACT_RES".

The discovery selection command "DISCOVER_SELECT_COM" is a message for selecting the RF technology (target 11) and the RF protocol. A selected RF technology (target 11) is input in the parameter "Target ID", and a selected RF protocol is input to the parameter "Target SAP" of the discovery selection command "DISCOVER_SELECT_COM".

The discovery selection response "DISCOVER_SELECT_RES" is a message for responding to the discovery selection command. The discovery selection response "DISCOVER_SELECT_RES" includes OK=1 or NG=0, which represents the response result, as a parameter.

The deactivation command "DEACT_COM" is a message for requesting the completion of the data exchange with the target 11. The deactivation command "DEACT_COM" includes "Target ID" corresponding to the RF technology, "Target SAP" corresponding to the RF protocol, and "Deactivation Type" which is the command to be sent to the target, as parameters.

The deactivation response "DEACT_RES" is a message for responding to the deactivation command "DEACT_COM". The deactivation response "DEACT_RES" includes OK=1 or NG=0, which represents the response result, as a parameter.

FIG. 8 shows formats for the discovery notification "DISCOVER_NTF", the activation notification "ACT_NTF", and the deactivation notification "DEACT_NTF".

The discovery notification "DISCOVER_NTF" is a message for the notification of the target, and the RF technology and the RF protocol thereof. There are a plurality of combinations of the target, the RF technology, and the RF protocol in some cases in the same manner as in the aforementioned discovery selection command "DISCOVER_SELECT_COM".

The discovery notification "DISCOVER_NTF" includes "Target ID" which is the number allotted by the CLF 22 to the RF technology, "Target SAP" which is the number allotted by the CLF 22 to the RF protocol, "Discovery Type" representing the detected RF technology, "RF Protocol" representing the RF protocol of the target 11, the "Technology Specific Parameters" representing the RF technology specific parameter, and "More" representing the presence of the next discovery notification "DISCOVER_NTF", as parameters.

The activation notification "ACT_NTF" is a message for the notification of the activation (activating, starting) of a specific interface level (activation, start). The activation notification "ACT_NTF" includes "Activation Parameters" representing the activation parameters and "Interface Type" representing the activated interface level as well as the aforementioned "Target ID", "Target SAP", "Discovery Type", and "RF protocol", as parameters.

The deactivation notification "DEACT_NTF" is a message for the notification of the deactivation (deactivating) of a specific interface level. The deactivation notification "DEACT_NTF" includes "Deactivation Parameters" representing the deactivation parameters as well as the aforementioned "Target ID" and "Target SAP", as parameters.

FIG. 9 shows a list of messages described with reference to FIGS. 4 to 8.

[Sequence Outline]

Figure 10:
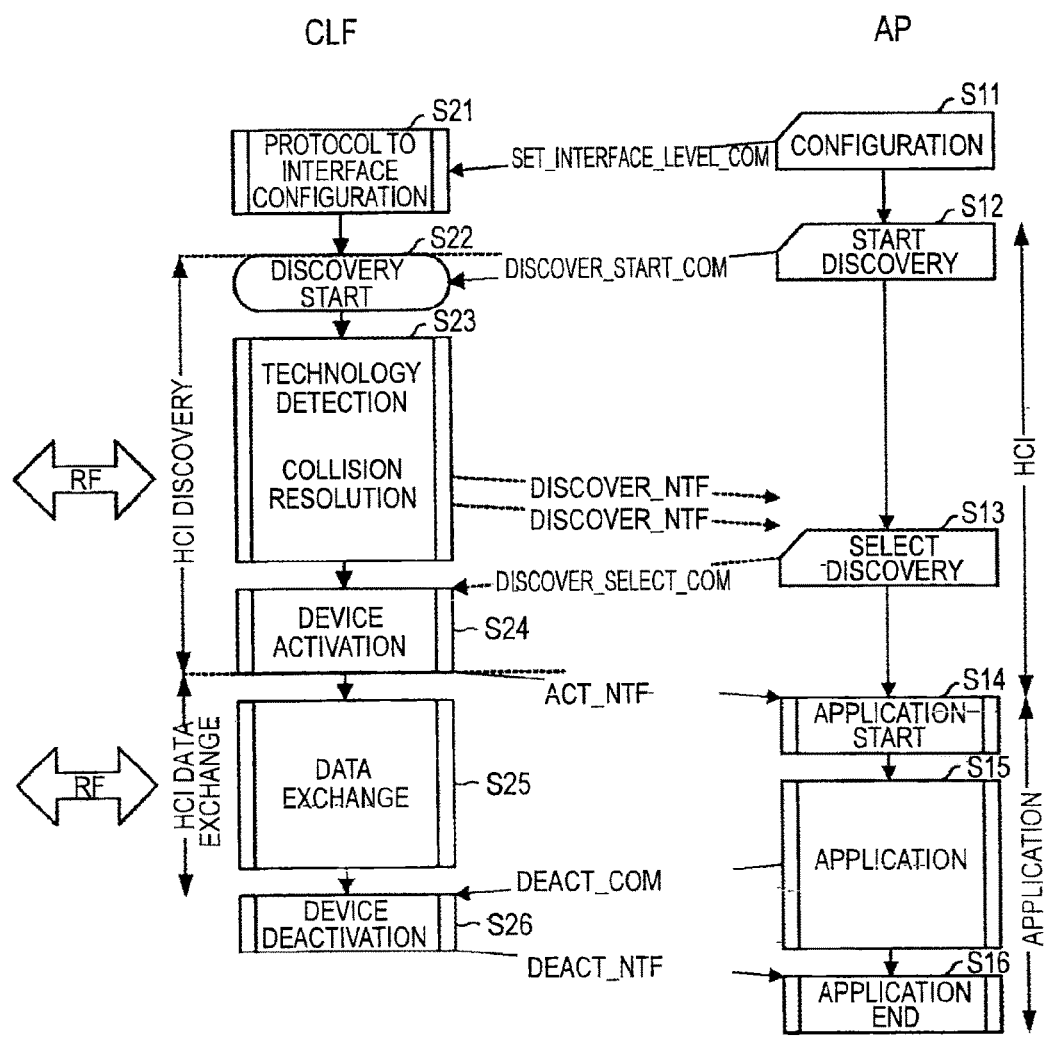
FIG. 10 is a diagram showing a list of messages.

Next, description will be made of the outline of the sequence performed between the AP 21 and the CLF 22 when the AP 21 exchanges data with the target 11 with reference to FIG. 10.

The sequence performed between the AP 21 and the CLF 22 when the AP 21 exchanges data with the target 11 roughly includes the following five steps.

(1) Initialization processing for setting interface level for RF protocol
(2) Discovery processing for target 11
(3) Activation processing for interface
(4) Data exchange processing
(5) Deactivation processing for interface When the AP 21 exchanges data with a plurality of targets 11, the steps from (3) to (5) are sequentially executed for each of the plurality of target 11.

(1) Initialization Processing for Setting Interface Level for RF Protocol

In the initialization processing, the AP 21 designates (notifies of) the interface level of the CLF 22 by sending the interface level setting command "SET_INTERFACE_LEVEL_COM" after checking the interface ability of the CLF 22. The initialization processing corresponds to the processing in Step S11 of the AP 21 and the processing in Step S21 of the CLF 22 in FIG. 10.

(2) Discovery Processing for Target 11

The discovery processing is processing for detecting the target 11. If the AP 21 sends the discovery start command "DISCOVER_START_COM" for requesting the start of the detection of the target 11 to the CLF 22 in Step S12, the CLF 22 starts the processing of detecting the target 11 in Step S22.

In the detection of the target 11, the CLF 22 alternately repeats the Poll Mode and the Listen Mode. That is, the CLF 22 repeats processing of setting the polling command and waiting for the response from the counterpart (Poll Mode) and processing of waiting for the polling command from the counterpart (Listen Mode) thereafter.

In the Poll Mode, if the CLF 22 receives a response for the sent polling command, the communication link with the target 11 is regarded to have been established, and the mode at that time (Poll Mode) is maintained. In the Poll Mode, the CLF 22 can act as a PCD or an Initiator and send a command.

On the other hand, in the Listen Mode, if the CLF 22 sends a response to the polling command from the counterpart, the communication link with the target 11 is regarded to have been established, and the mode at that time (Listen Mode) is maintained. In the Listen Mode, the CLF 22 can act as a PICC or a Target and respond to the received command (send the response).

The CLF 22 notifies the AP 21 of the detected target 11 by the discovery notification "DISCOVER_NTF" in Step S23. When a plurality of targets 11 are detected, the CLF 22 sends the discovery notification "DISCOVER_NTF" for each of all detected targets 11.

(3) Activation Processing for Interface

The AP 21 receives the discovery notification "DISCOVER_NTF", then selects one predetermined target 11 from among the received targets, and sends the discovery selection command "DISCOVER_SELECT_COM" to the CLF 22 in Step S13.

The CLF 22 receives the discovery selection command "DISCOVER_SELECT_COM" and activates the interface of the one selected target 11 based on the discovery selection command "DISCOVER_SELECT_COM" in Step S24. Then, the CLF 22 notifies the AP 21 of the fact that the interface of the target 11 selected by the discovery selection command "DISCOVER_SELECT_COM" has been activated, by the activation notification "ACT_NTF".

In addition, this processing is processing in the case of the Poll Mode, and different processing is performed in the case of the Listen Mode since the AP 21 does not select the target 11. That is, the CLF 22 responds with a plurality of RF technologies in the Listen Mode when the CLF 22 retains a state machine for the plurality of RF technologies. The CLF 22 responds with the RF technology detected first when the CLF 22 retains a state machine for one RF technology. The CLF 22 activates the interface of the responding target 11 and notifies the AP 21 of the fact by the activation notification "ACT_NTF". Since the target 11 sends a command in the Listen Mode, the CLF 22 performs processing in accordance with the received command.

(4) Data Exchange Processing

The AP 21 receives the activation notification "ACT_NTF" from the CLF 22 and then activates the application in Step S14. At this time, the AP 21 selects one of the applications App (H), App (M), and App (L) in accordance with the interface level of the CLF 22.

The AP 21 exchanges data with the target 11 through the CLF 22 by the activated application in Step S15. The CLF 22 exchanges data between the AP 21 and the target 11 in Step S25.

(5) Deactivation Processing for Interface

In the Poll Mode, the application activated in the AP 21 sends the deactivation command "DEACT_COM" to the CLF 22 at the time of the completion of the application. The CLF 22 receives the deactivation command "DEACT_COM", deactivates the interface of the communicating target 11, and disconnects the communication link with the target 11 in Step S26.

On the other hand, the CLF 22 sends the deactivation notification "DEACT_NTF" to the AP 21 after the disconnection of the communication link with the communicating target 11 in the Listen Mode. The AP 21 completes the application when the deactivation notification "DEACT_NTF" is received in Step S16.

The rough sequence flow has been described above for the example in which communication is performed by one target 11.

[Detailed Example of Sequence (In the Case of Poll Mode)]

Hereinafter, detailed description will be made of the sequence performed between the AP 21 and the CLF 22 when the AP 21 exchanges data with a plurality of targets 11 with reference to FIGS. 11 to 13.

FIG. 11 shows the RF technology and the RF protocol supported by each of the targets 11-1 to 11-3.

The target 11-1 supports NFC-A as the RF technology and two RF protocols including ISO-DEP and NFC-DEP. The target 11-2 supports NFC-B as the RF technology and ISO-DEP as the RF protocol. The target 11-3 supports the NFC-F as the RF technology and T3T as the RF protocol.

Figure 12:
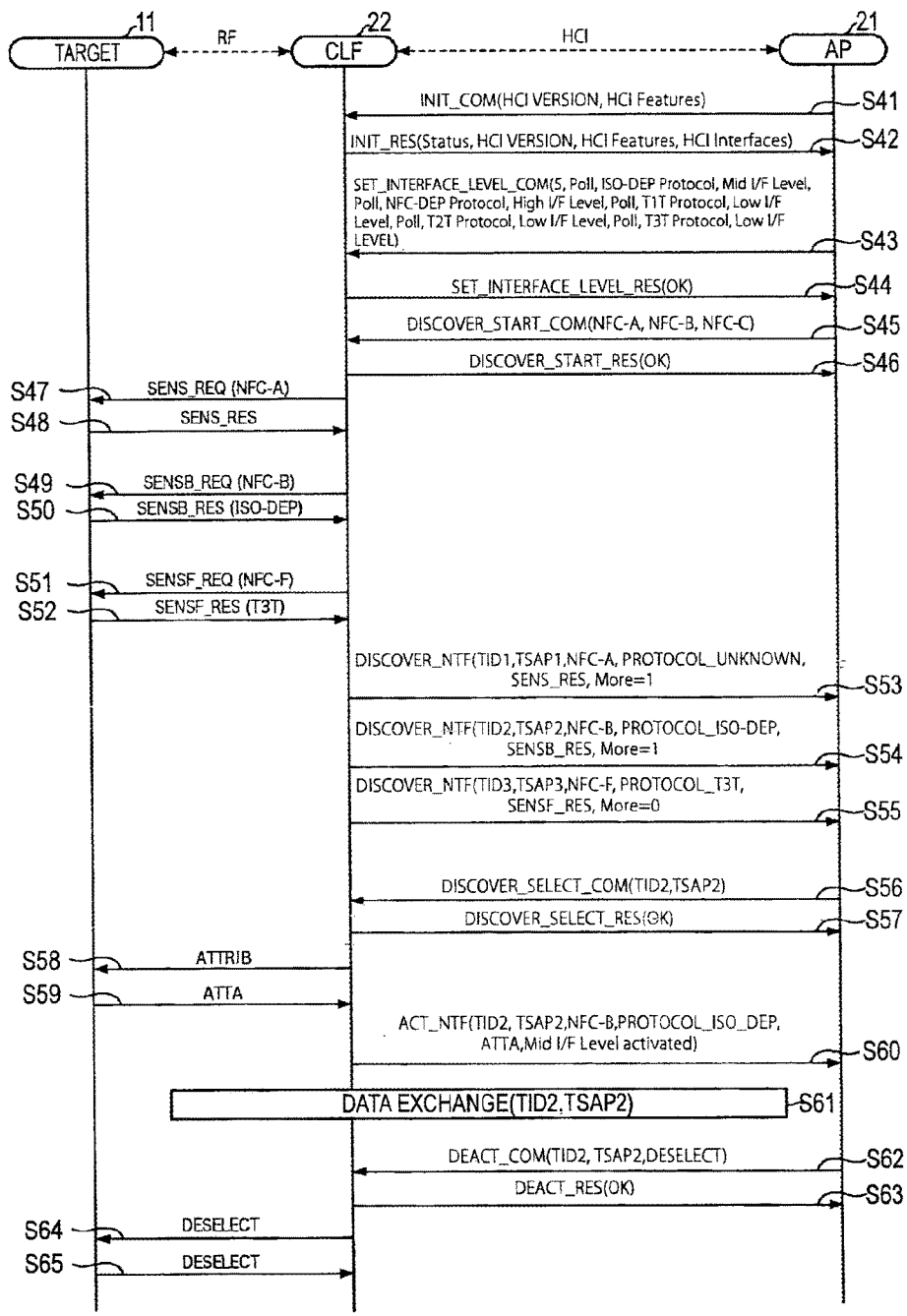
FIG. 12 is a diagram illustrating a detailed sequence example in the case of a Poll Mode.
Figure 13:
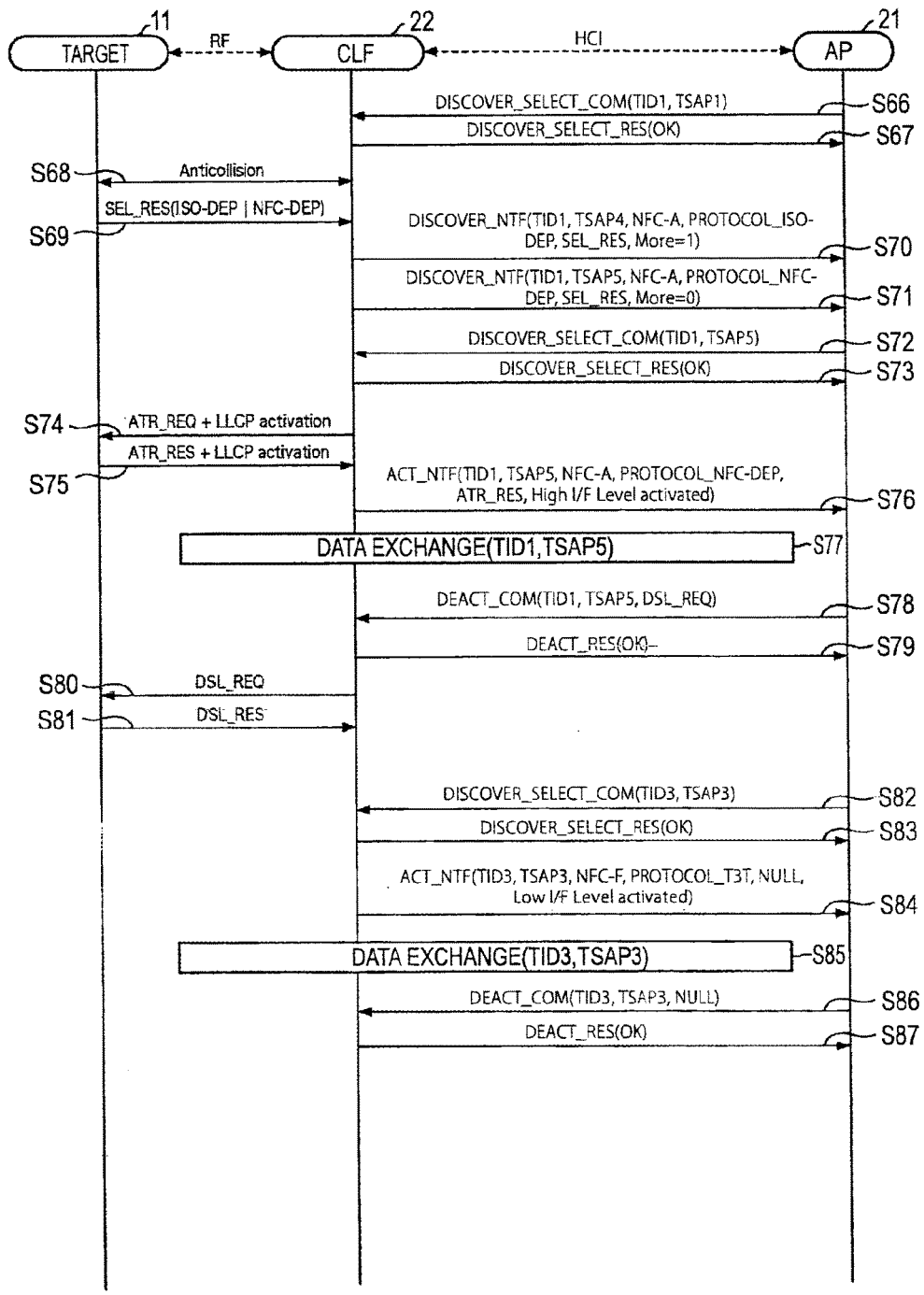
FIG. 13 is a flowchart illustrating a detailed sequence example in the case of a Poll Mode.

In FIG. 11, "Target ID" and "Target SAP" shown in the right side of the section for the RF protocol represent identifiers allotted to the detected target 11 by the CLF 22 in a series of sequence shown in FIGS. 12 and 13.

[Sequence Example for Poll Mode]

FIGS. 12 and 13 are flowcharts showing a sequence in which the NFC device 1 (CLF 22) is operated in the Poll Mode to communicate with three targets 11-1 to 11-3 with different RF technologies.

First, the AP 21 sends an initialization command INIT_COM in Step S41, and the CLF 22 sends an initialization response INIT_RES as a response to the AP 21 in Step S42. The initialization response INIT_RES includes an interface level for each RF protocol supported by the CLF 22 as described above.

In Step S43, the AP 21 sends an interface level setting command SET_INTERFACE_LEVEL_COM for associating the RF protocol and the interface level to the CLF 22 based on the interface level for each RF protocol supported by the CLF 22. In Step S43, SET_INTERFACE_LEVEL_COM (5, Poll, ISO-DEP Protocol, Mid I/F Level, Poll, NFC-DEP Protocol, High I/F Level, Poll, T1T Protocol, Low I/F Level, Poll, T2T Protocol, Low I/F Level, Poll, T3T Protocol, Low I/F Level) is sent. With such a command, the middle interface level is set when the RF protocol is ISO-DEP, the high interface level is set for NFC-DEP, and the low interface level is set for T1T, T2T, and T3T in the CLF 22 in the Poll Mode.

Although setting is made for the RF protocols T1T, T2T, and T3T in this example, the levels of the RF protocols T1T, T2T, and T3T may be fixed to the low level, and the sending of the command and the setting may be omitted since only the low interface level can be set for the RF protocols T1T, T2T, and T3T.

Since the sequence of FIG. 12 describes an example in which the NFC device 1 (CLF 22) is operated in the Poll Mode, the designation of each interface level in the Listen Mode is omitted in the interface level setting command SET_INTERFACE_LEVEL_COM in Step S43.

The CLF 22 sends an interface level setting response SET_INTERFACE_LEVEL_RES which represents that the interface level setting command SET_INTERFACE_LEVEL_COM from the AP 21 has been understood in Step S44.

Then, the AP 21 designates NFC-A, NFC-B, and NFC-F as the RF technologies of the detection targets and sends a discovery start command DISCOVER_START_COM to the CLF 22 in Step S45. The CLF 22 sends a discovery start response DISCOVER_START_RES representing that the discovery start command DISCOVER_START_COM has been understood to the AP 21 in Step S46.

Then, the CLF 22 sends a command for detecting the targets 11 for NFC-A, NFC-B, and NFC-F designated as the RF technologies of the detection targets. Specifically, the AP 21 sends a command SENS_REQ for NFC-A in Step S47 and receives a response SENS_RES for the command SENS_REQ which is sent from the target 11-1 in the RF field in Step S48. The RF protocol of the target 11-1 is not yet known at the time of receiving the response SENS_RES.

In addition, the AP 21 sends a command SENSB_REQ for NFC-B in Step S49 and receives a response SENSB_RES for the command SENSB_REQ which is sent from the target 11-2 in the RF field in Step S50. The fact that the RF protocol of the target 11-2 is ISO-DEP is known by receiving the response SENSB_RES.

Moreover, the AP 21 sends a command SENSF_REQ for NFC-F in Step S51 and receives a response SENSF_RES for the command SENSF_REQ which is sent from the target 11-3 in the RF field in Step S52. The fact that the RF protocol of the target 11-3 is T3T is known by receiving the response SENSF_RES.

Although the CLF 22 alternately repeats the Poll Mode and the Listen Mode if no target 11 is detected, the operation in the Listen Mode is not performed since the targets 11-1 to 11-3 are detected in the Poll Mode.

The CLF 22 sends three discovery notifications DISCOVER_NTF for the notification of the detected targets 11-1 to 11-3 to the AP 21 in Steps S53 to S55. Specifically, the CLF 22 allots "TID1" as the Target ID and "TSAP1" as the Target SAP for the detected target 11-1 of NFC-A and sends a discovery notification DISCOVER_NTF to the AP 21 in Step S53.

The CLF 22 allots "TID2" as the Target ID and "TSAP2" as the Target SAP for the detected target 11-2 of NFC-B and sends a discovery notification DISCOVER_NTF to the AP 21 in Step S54. The CLF 22 allots "TID3" as the Target ID and "TSAP3" as the Target SAP for the detected target 11-3 of NFC-F and sends a discovery notification DISCOVER_NTF to the AP 21 in Step S55.

Here, the last parameters "More" of the discovery notifications DISCOVER_NTF sent in Steps S53 and S54 are "1" since the discovery notification DISCOVER_NTF will be sent again. On the other hand, the last parameter "More" of the discovery notification DISCOVERY_NTF sent in Step S55 is "0" since no discovery notification DISCOVER_NTF will be sent again.

In the following sequence, the target 11 is specified by the Target ID and the Target SAP allotted by the CLF 22, and messages are exchanged between the AP 21 and the CLF 22.

The AP 21 selects communication with the target 11-2 from among the detected targets 11-1 to 11-3 and sends a discovery selection command DISCOVER_SELECT_COM with parameters of TID2 for "Target ID" and TSAP2 for "Target SAP" in Step S56.

The CLF 22 receives the discovery selection command DISCOVER_SELECT_COM and sends a discovery selection response DISCOVER_SELECT_RES representing that the command has been understood to the AP 21 in Step S57.

The middle interface level is designated by the aforementioned interface level setting command SET_INTERFACE_LEVEL_COM for the RF protocol of ISO-DEP represented by "Target SAP"=TSAP2 included in the discovery selection command DISCOVER_SELECT_COM. The protocol activation is the processing performed by the CLF 22 in the middle interface level as described above with reference to FIG. 3.

Thus, the CLF 22 performs the protocol activation in Step S58. That is, the CLF 22 informs of its own attributes (specifications) and sends an ATTRIB command for requesting the attributes of the target 11-2 to the target 11-2. The CLF 22 receives a response ATTA from the target 11-2 as a response for the ATTRIB command in Step S59.

If the response ATTA is received, the CLF 22 sends an activation notification ACT_NTF representing the fact that the activation of the interface in the middle interface level has been completed to the AP 21 in Step S60. The parameters of the activation notification ACT_NTF include a received response "ATTA" as "Activation Parameter" and "Mid I/F Level activated" representing the activated interface level as "Interface Type".

After the completion of the interface activation, the application App (M) corresponding to the middle interface level in the AP 21 is started to exchange data between the AP 21 and the target 11-2 (TID2) with the use of the RF protocol ISO-DEP (TSAP2) in Step S61.

When predetermined data exchange is performed, and the application App (M) is completed, the AP 21 sends a deactivation command DEACT_COM to the CLF 22 in Step S62. The parameter "Deactivation Type" of the deactivation command DEACT_COM includes a command "DESELECT" to be sent to the target 11-2.

The CLF 22 sends a deactivation response DEACT_RES representing the fact that the deactivation command DEACT_COM has been understood to the AP 21 in Step S63.

Then, the CLF 22 sends a DESELECT command to the target 11-2 based on the parameter "Deactivation Type" included in the deactivation command DEACT_COM in Step S64. The CLF 22 receives the response DESELECT from the target 11-2 and deactivates the interface in Step S65. The parameters relating to the target 11-2 (TID2) and ISO-DEP (TSAP2) are released by the deactivation of the interface.

From Step S66 in FIG. 13, the target 11-1 (TID1) is selected as a communication counterpart, and communication is performed between the AP 21 and the target 11-1 (TID1).

That is, the AP 21 sends a discovery selection command DISCOVER_SELECT_COM with parameters of TID1 as "Target ID" and TSAP1 as "Target SAP" to the CLF 22 in Step S66.

The CLF 22 receives the discovery selection command DISCOVER_SELECT_COM and sends a discovery selection response DISCOVER_SELECT_RES representing that the command has been understood to the AP 21 in Step S67.

Then, the CLF 22 recognizes a predetermined PICC and performs anticollision processing for communication even if a plurality of PICCs (IC cards) exist between the CLF 22 and the target 11-1 corresponding to the parameter TID1 and the TSAP1, in Step S68.

In Step S69, the CLF 22 receives a response SEL_RES (ISO-DEP|NFC-DEP) representing that ISO-DEP and NFC-DEP are supported as the RF protocols from the target 11-1.

The CLF 22 allots "TSAP4" as the Target SAP for the RF protocol ISO-DEP and "TSAP5" as the Target SAP for the RF protocol NFC-DEP, and sends discovery notifications DISCOVER_NTF to the AP 21 in Steps S70 and S71. That is, the CLF 22 sends a discovery notification DISCOVER_NTF (TID1, TSAP4, NFC-A, PROTOCOL_ISO_DEP, SEL_RES, More=1) to the AP 21 in Step S70 and sends a discovery notification DISCOVER_NTF (TID1, TSAP5, NFC-A, PROTOCOL NFC DEP, SEL_RES, More=0) to the AP 21 in Step S71.

The AP 21 selects NFC-DEP from among the two RF protocols and sends a discovery selection command DISCOVER_SELECT_COM with parameters TID1 as "Target ID" and TSAP5 as "Target SAP" in Step S72.

In Step S73, the CLF 22 receives the discovery selection command DISCOVER_SELECT_COM and sends a discovery selection response DISCOVER_SELECT_RES representing that the command has been understood to the AP 21.

The high interface level is designated for the RF protocol NFC-DEP in the aforementioned interface level setting in Step S43. Thus, the CLF 22 performs protocol activation (ATR_REQ command for requesting attributes) and LLCP activation in Step S74.

In Step S75, the CLF 22 receives the results of the response ATR_RES and the LLCP activation as a response to the ATR_REQ command from the target 11-1. Then, the CLF 22 sends an activation notification ACT_NTF representing the fact that the interface activation in the high level has been completed to the AP 21 in Step S76. The parameters of the activation notification ACT_NTF include received response "ATR_RES" as "Activation Parameter" and "High I/F Level activate" representing the activated interface level as "Interface Type".

After the completion of the interface activation, the application App (H) corresponding to the high interface level in the AP 21 is started to exchange data between the AP 21 and the target 11-1 (TID1) with the use of the RF protocol NFC-DEP (TSAP5) in Step S77.

When predetermined data exchange is performed, and the application App (H) is completed, the AP 21 sends a deactivation command DEACT_COM to the CLF 22 in Step S78. The parameter "Deactivation Type" of the deactivation command DEACT_COM includes a command "DSL_REQ" to be sent to the target 11-1.

The CLF 22 sends a deactivation response DEACT_RES representing the fact that the deactivation command DEACT_COM has been understood to the AP 21 in Step S79.

Then, the CLF 22 sends a DSL_REQ command to the target 11-1 based on the parameter "Deactivation Type" included in the deactivation command DEACT_COM in Step S80. The CLF 22 receives the response DSL_RES from the target 11-1 and deactivates the interface in Step S81. The parameters relating to the target 11-1 (TID1) and NFC-DEP (TSAP5) are released by the deactivation of the interface.

From Step S82, the target 11-3 (TID3) is selected as a communication counterpart, and communication is performed between the AP 21 and the target 11-3 (TID3).

Specifically, the AP 21 sends a discovery selection command DISCOVER_SELECT_COM with parameters of TID3 (NFC-F) as "Target ID" and TSAP3 (T3T) as "Target SAP" to the CLF 22 in Step S82.

The CLF 22 receives the discovery selection command DISCOVER_SELECT_COM and sends a discovery selection response DISCOVER_SELECT_RES representing that the command has been understood to the AP 21 in Step S83.

The low interface level is designated for the RF protocol T3T in the aforementioned interface level setting in Step S43. No protocol activation is performed in the low interface level. Therefore, the CLF 22 immediately sets "NULL" for the parameter of "Activation Parameters" and sends an activation notification ACT_NTF representing that the interface activation in the low level has been completed to the AP 21 in Step S84.

After the completion of the interface activation, the application App (L) corresponding to the low interface level in the AP 21 is started to exchange data between the AP 21 and the target 11-3 (TID3) with the use of the RFprotocol T3T (TSAP3) in Step S85.

When predetermined data exchange is preformed, and the application App (L) is completed, the AP 21 sends a deactivation command DEACT_COM to the CLF 22 in Step S86. Since no protocol deactivation is performed in the same manner as the protocol activation, the parameter "Deactivation Type" of the deactivation command DEACT_COM is "NULL".

The CLF 22 sends a deactivation response DEACT_RES representing the fact that the deactivation command DEACT_COM has been understood to the AP 21 in Step S87. Thereafter, the CLF 22 deactivates the interface and releases the parameters relating to the target 11-3 (TID3) and T3T (TSAP3).

As described above, the NFC device 1 (the AP 21 and the CLF 22) can be operated as a polling device and detect a plurality of targets 11 with different RF protocols. In addition, the NFC device 1 can sequentially exchange data with a plurality of detected targets 11.

[Detailed Example of Sequence (In the Case of Listen Mode)]

Next, description will be made of a sequence in which the NFC device 1 is operated in the Listen Mode with reference to FIGS. 14 and 15.

Figure 14:
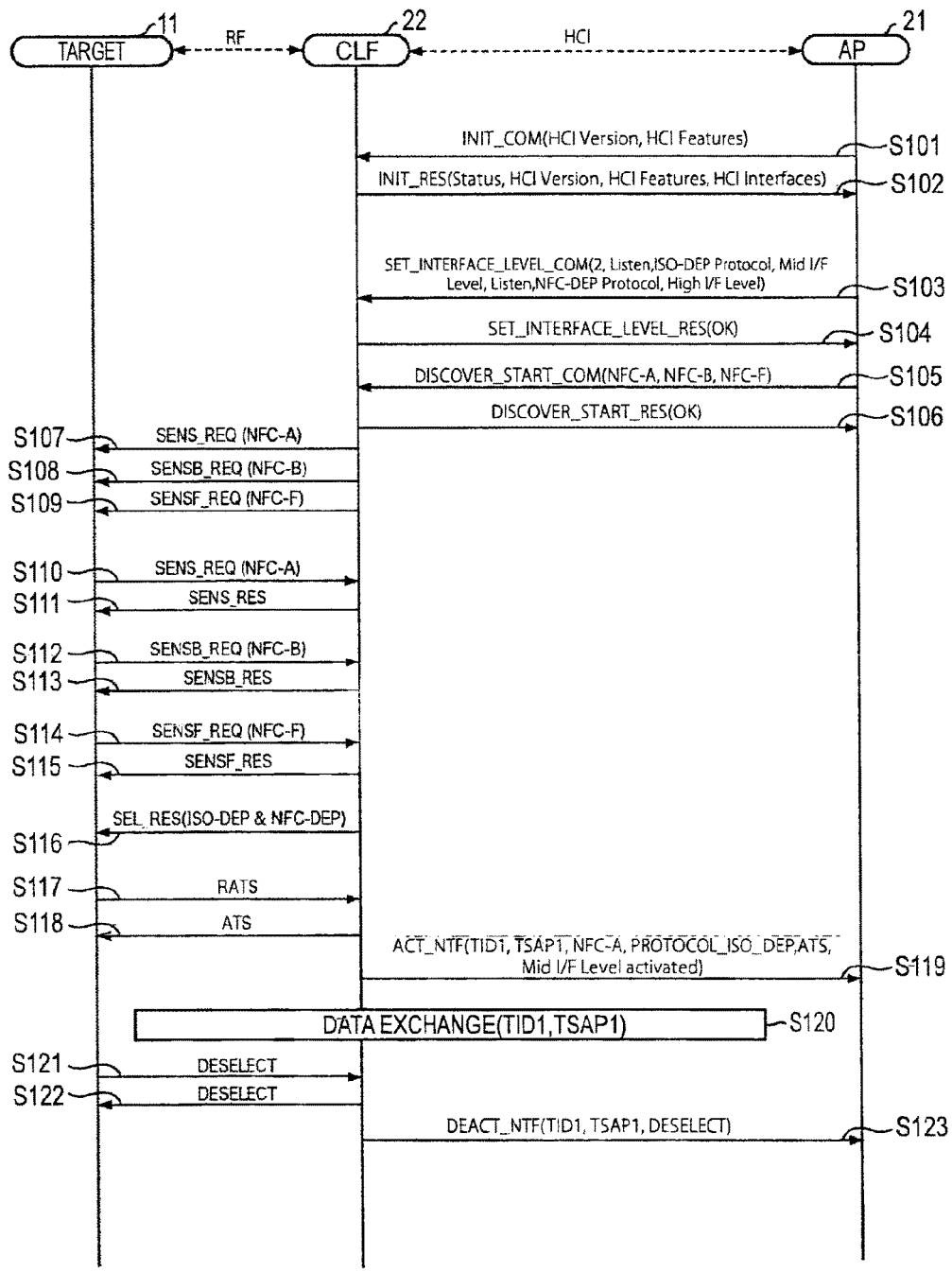
FIG. 14 is a flowchart illustrating a detailed sequence example in the case of a Listen Mode.

In the examples of FIGS. 14 and 15, the RF protocol supported by the target 11-3 is NFC-DEP, unlike the example in FIG. 11.

First, the AP 21 sends an initialization command INIT_COM in Step S101, and the CLF 22 sends an initialization response INIT_RES as a response to the AP 21 in Step S102. The initialization response INIT_RES includes an interface level for each RF protocol supported by the CLF 22 as described above.

The AP 21 sends an interface level setting command SET_INTERFACE_LEVEL_COM for associating between the RF protocol and the interface level to the CLF 22 based on the interface level for each RF protocol supported by the CLF 22 in Step S103. In the example of FIG. 14, SET_INTERFACE_LEVEL_COM (2, Listen, ISO-DEP Protocol, Mid I/F Level, Listen, NFC-DEP Protocol, High I/F Level) is sent, and the middle level is designated for the RF protocol ISO-DEP and the high level is designated for NFC-DEP in the Listen Mode. Since the level of the RF protocols T1T, T2T, and T3T are fixed to the low level, the designation thereof is omitted. In addition, each interface level in the Poll Mode is also omitted.

The CLF 22 sends an interface level setting response SET_INTERFACE_LEVEL_RES representing that the interface level setting command SET_INTERFACE_LEVEL_COM from the AP 21 has been understood to the AP 21 in Step S104.

In Step S105, the AP 21 designates NFC-A, NFC-B, and NFC-F as the RF technologies of the detection targets and sends a discovery start command DISCOVER_START_COM to the CLF 22. The CLF 22 sends a discovery start response DISCOVER_START_RES representing that the discovery start command DISCOVER_START_COM has been understood to the AP 21 in Step S106.

Then, the CLF 22 firstly sends a polling command for operating the NFC device 1 in the Poll Mode for NFC-A, NFC-B, and NFC-F designated as the RF technologies of the detection targets. Specifically, the CLF 22 sequentially sends commands SENS_REQ, SENSB_REQ, and SENSF_REQ for operating the NFC device 1 in the Poll mode in Steps S107 to S109.

Since the responses for the commands SENS_REQ, SENSB_REQ, and SENSF_REQ have not been received, the CLF 22 then detects the polling command for operating the NFC device 1 in the Listen Mode and responds.

Specifically, the CLF 22 receives the command SENS_REQ sent from the target 11-1 in Step S110 and sends the response SENS_RES to the target 11-1 in Step S111.

In addition, the CLF 22 receives the command SENSB_REQ sent from the target 11-2 in Step S112 and sends the response SENSB_RES to the target 11-2 in Step S113.

Furthermore, the CLF 22 receives the command SENSF_REQ sent from the target 11-3 in Step S114 and sends the response SENSF_RES to the target 11-3 in Step S115.

In Step S116, the CLF 22 sends a response SRL_RES (ISO-DEP & NFC-DEP) representing that ISO-DEP and NFC-DEP are supported as the RF protocols to the target 11-1 detected first.

Since the middle or higher interface level is designated for RF protocols ISO-DEP and NFC-DEP of the target 11-1, the CLF 22 waits for the protocol activation by the target 11-1. Then, the CLF 22 receives a RATS (Request for Answer To Select) for requesting for ATS from the target 11-1 in Step S117 and sends an ATS response for the command to the target 11-1 in Step S118. With such operations, the protocol activation by the RF protocol ISO-DEP is completed.

After receiving the RATS command, the CLF 22 sends an activation notification ACT_NTF (TID1, TSAP1, NFC-A, PROTOCOL_ISO_DEP, ATS, Mid I/F Level activated) representing that the interface activation has been completed to the AP 21 in Step S119.

In Step S120, the application App (M) corresponding to the middle interface level in the AP 21 is started to exchange data between the AP 21 and the target 11-1 (TID1) with the use of the RF protocol ISO-DEP (TSAP1).

After the predetermined data exchange has been performed, the CLF 22 receives a command DESELECT from the target 11-1 as a PCD (reader writer) in Step S121 and sends a DESELECT response to the target 11-1 in Step S122. With such operations, the interface with the use of the RF protocol ISO-DEP is deactivated in the CLF 22.

Then, the CLF 22 sends a deactivation notification DEACT_NTF to the AP 21 with the parameters of TID1 as "Target ID", TSAP1 as "Target SAP", and DESELECT as "Deactivation Parameter" in Step S123. The AP 21 receives the deactivation notification DEACT_NTF and then completes the application App (M).

Although data exchange is then performed with the target 11-2, which has been secondly detected, for which allocation has been made such that "Target ID"=TID2 and "Target SAP"=TSAP2, the description of the processing will be omitted.

Then, exchange is performed with the target 11-3, which has been thirdly detected, for which allocation has been made such that "Target ID"=TID3 and "Target SAP"=TSAP3.

In Step S124 in FIG. 15, the CLF 22 receives a command ATR_REQ for requesting the attributes from the target 11-3. The high interface level is designated for the RF protocol NFC-DEP in the aforementioned Step S103. Therefore, the CLF 22 sends the response ATR_RES as a response to the command ATR_REQ and performs LLCP activation in Step S125.

After the protocol activation and the LLCP activation, the CLF 22 sends an activation notification ACT_NTF to the AP 21 in Step S126. The parameters of the activation notification ACT_NTF include the received response "ATR_RES" as "Activation Parameter" and "High I/F Level activated" representing the activated interface level as "Interface Type".

In Step S127, the application App (H) corresponding to the high interface level in the AP 21 is started to exchange data between the AP 21 and the target 11-3 (TID3) with the use of the RF protocol NFC-DEP (TSAP3).

After the predetermined data exchange, the CLF 22 receives a command DSL_REQ from the target 11-3 as the initiator (reader writer) in Step S128 and sends a response DSL_RES to the target 11-3 in Step S129. With such operations, the interface with the use of the RF protocol NFC-DEP is deactivated in the CLF 22.

Then, the CLF 22 sends a deactivation notification DEACT_NTF to the AP 21 in Step S130. Specifically, the CLF 22 sends a deactivation notification DEACT_NTF with parameters of TID3 as "Target ID", TSAP3 as "Target SAP", and DSL_REQ as "Deactivation Parameter". The AP 21 receives the deactivation notification DEACT_NTF and then completes the application App (H).

The NFC device 1 (the AP 21 and the CLF 22) can be operated as a listening device and detects a plurality of targets 11 with different RF protocols. In addition, the NFC device 1 can sequentially exchange data with the detected plurality of targets 11.

The NFC device 1 for the near field wireless communication based on ISO/IEC 18092 or ISO/IEC 14443 is operated while being functionally divided into the AP 21 and the CLF 22. The AP 21 mainly executes the application and performs overall control of the NFC device 1. The CLF 22 is disposed between the AP 21 and the target 11 and mainly sends and receives RF data with the target 11 (a PICC (IC card) of ISO/IEC 14443 or a target of ISO/IEC 18092) through the antenna 24.

The AP 21 selects (designates) one interface level from among a plurality of interface levels supported by the CLF 22 for each RF protocol and notifies the CLF 22. The plurality of interface levels are classified depending on up to which level of processing the CLF 22 positioned in between is burdened when the NFC device 1 exchanges data with the target 11. Specifically, when the interface level is classified into three stages including a low level, a middle level, and a high level, the amount of the processing allotted to the CLF 22 is the largest at the high level, and the amount of the processing allotted to the CLF 22 is the smallest at the low level. The AP 21 obtains information regarding the interface level supported by the CLF 22 and designates a predetermined interface level for each RF protocol with respect to the CLF 22. Then, the AP 21 activates and executes an application App at a level corresponding to the designated interface level. With such a configuration, the AP 21 can concentrate on the execution of the application processing by allotting processing, which can be executed by the CLF 22, to the CLF 22. In addition, when the CLF22 supports a higher interface level, the CLF 22 and the AP 21 can exchange data at a higher interface level (data exchange in units in which the application of the AP 21 can more easily perform processing) by setting the interface level to be as high as possible. With such a configuration, the target 11 and the NFC DEVICE 1 can effectively exchange data.

When the CLF 22 is operated as a polling device, the CLF 22 sends a polling command, detects (discovers) a plurality of targets 11, and then notifies the AP 21 of all detected targets 11 (discovery notification DISCOVER_NTF). Then, a target 11 for communication is sequentially selected one by one by the AP 21 from among the plurality of detected targets 11, and communication (data execution by the application) is executed. With respect to each of the selected targets 11, operations including interface activation, application execution in accordance with the interface level (including start and completion), and interface deactivation are performed. With such operations, it is possible to effectively exchange data with a plurality of targets 11 with different RF technologies or RF protocols.

On the other hand, when the CLF 22 is operated as a listening device, a target 11 is selected as a communication counterpart from among a plurality of targets 11, with which a communication link has been established, in the detection order. The CLF 22 activates the interface corresponding to the RF protocol of the selected target 11 and notifies the AP 21 (activation notification ACT_NTF). The AP 21 executes (including start and completion) the application in accordance with the interface level of the target 11 for which the activation notification has been made. Accordingly, communication (data exchange by the application) with the plurality of targets 11 with which a communication link has been established is sequentially executed. With such a configuration, it is possible to effectively exchange data with a plurality of targets 11 with different RF technologies or RF protocols.

The above description was made of an example in which the processing necessary for the data communication between the target 11 and the AP 21 is performed by CLF 22 instead in accordance with the interface level designated for a predetermined RF protocol.

However, the CLF 22 performs processing to be performed by the AP 21 instead of the AP 21 in accordance with the interface level designated for a predetermined RF protocol in the data exchange processing between the target 11 and the AP 21, in some cases.

For example, if the NFC device 1 is in a reader/writer mode, and the interface level activated by the CLF 22 is the high level, the CLF 22 performs the processing for accessing the NDEF data instead of the AP 21. Here, the NDEF data is data in a common data format NDEF (NFC Data Exchange Format) used by applications.

Specific description will be made of an example of an NFC FORUM Type 3 Tag Operation which is a specification of Type 3 from among the Tag Operations defining a command for accessing the NDEF data. When the NDEF data is read in the NFC FORUM Type 3 Tag Operation, Polling Command/Response and Check Command/Response are exchanged between the target 11 and the NFC device 1. The exchange of Check Command/Response is performed a plurality of times in some cases in accordance with the NDEF data size. When Check Command/Response has been exchanged a plurality of times, the data obtained by coupling the data obtained by Check Command/Response exchanged the plurality of times becomes the NDEF data.

When the interface level of the CLF 22 is the high level, the CLF 22 voluntarily executes Polling Command/Response and Check Command/Response once or more. When Check Command/Response is exchanged a plurality of times, the CLF 22 couples the data obtained by exchanging Check Command/Response the plurality of times to generate NDEF data. On the other hand, the interface level of the CLF 22 is the middle or low level, the CLF 22 only relays Polling Command/Response supplied from the AP 21 and Check Command/Response exchanged once or more. The AP 21 also performs the processing of generating the NDEF data from the data obtained by exchanging Check Command/Response the plurality of times.

The steps described in the flowchart may of course be executed in a time-series manner in the order described in this specification, or without executing the steps in the time-series manner, the steps may be executed in parallel or at a necessary timing such as by the timing of calling or the like.

In addition, the system in this specification represents the entire apparatus including a plurality of apparatuses.

The embodiments of the present disclosure are not limited to the aforementioned embodiments, and various modifications can be made within the range of the scope of the present disclosure.

For example, a program executed to perform a method according to some embodiments need not be stored in a non-transitory storage medium. The program can also be stored in a transitory storage medium, such as a propagating wave.

What is claimed is:

1. An information processing device, comprising:
   first processing circuitry configured to
   receive a command, select a predetermined interface capability from among a plurality of interface capabilities based on the command, and
   exchange data with second processing circuitry based on the predetermined interface capability,
   wherein the second processing circuitry is configured to exchange data with a target through the first processing circuitry.

2. The information processing device according to claim 1, wherein the predetermined interface capability is selected based on an RF protocol used in a communication between the target and the first processing circuitry.

3. The information processing device according to claim 2, wherein the first processing circuitry is further configured to transmit a second command and to receive a third command in response to the second command, the third command indicating the RF protocol.

4. The information processing device according to claim 3, wherein the first processing circuitry is further configured to receive from the second processing circuitry a fourth command, the fourth command associating the RF protocol with the predetermined interface capability.

5. The information processing device according to claim 3, wherein the first processing circuitry is further configured to send a fifth command based on the first command, the fifth command indicating the predetermined interface capability.

6. The information processing device according to claim 5, wherein the first processing circuitry is further configured to start and execute an application based on the predetermined interface capability, the application being configured to exchange data between the second processing circuitry and the target using the RF protocol.

7. The information processing device according to claim 2, wherein the first processing circuitry is further configured to receive a second command, to send a third command in response to the second command, and to receive the first command based on the third command.

8. The information processing device according to claim 7, wherein the first processing circuitry is further configured to receive from the second processing circuitry a fourth command, the fourth command associating the RF protocol with the predetermined interface capability.

9. The information processing device according to claim 8, wherein the first processing circuitry is further configured to send a fifth command in response to the first command, the fifth command indicating the predetermined interface capability.

10. The information processing device according to claim 9, wherein the first processing circuitry is further configured to start and execute an application based on the predetermined interface capability, the application being configured to exchange data between the second processing circuitry and the target using the RF protocol.

11. The information processing device according to claim 1, wherein the predetermined interface capability is selected based on an RF technology used in a communication between the target and the first processing circuitry.

12. The information processing device according to claim 11, wherein the first processing circuitry is further configured to transmit a second command and to receive a third command in response to the second command, the third command indicating the RF technology.

13. The information processing device according to claim 12, wherein the first processing circuitry is further configured to transmit a fourth command to the second processing circuitry, the fourth command indicating the RF technology.

14. The information processing device according to claim 13, wherein the first processing circuitry is further configured to start and execute an application based on the predetermined interface capability, the application being configured to exchange data between the first processing circuitry and the target using the RF technology.

15. The information processing device according to claim 11, wherein the first processing circuitry is further configured to receive a second command, to send a third command in response to the second command, and to receive the first command based on the third command.

16. The information processing device according to claim 15, wherein the first processing circuitry is further configured to send a fourth command in response to the first command, the fourth command indicating the predetermined interface capability.

17. The information processing device according to claim 1, wherein the first processing circuitry is further configured to receive a second command representing a version of the second processing circuitry, the first processing circuitry is further configured to transmit a third command in response to the second command, the third command representing a version of the first processing circuitry, and, when the version of the second processing circuitry is equivalent or higher than the version of the first processing circuitry, the first processing circuitry and the second processing circuitry exchange messages.

18. The information processing device according to claim 17, wherein the third command also represents the predetermined interface capability, and, when the version of the second processing circuitry is equivalent or higher than the version of the first processing circuitry, the second processing circuitry transmits a fourth command, the fourth command indicating at least one of a poll mode and a listen mode, an RF protocol, and an interface capability.

19. A communication method, comprising:
receiving a first command;
selecting, by first processing circuitry, a predetermined interface capability from among a plurality of interface capabilities based on the first command;
exchanging, by the first processing circuitry, data with second processing circuitry based on the predetermined interface capability; and
exchanging, by second processing circuitry, data with a target through the first processing circuitry.

20. A non-transitory, computer-readable storage medium encoded with computer executable instructions, wherein the instructions, when executed by a communication device, cause the communication device to perform a method comprising:
receiving a first command;
selecting, by first processing circuitry of the communication device, a predetermined interface capability from among a plurality of interface capabilities based on the first command;
exchanging, by the first processing circuitry, data with second processing circuitry based on the predetermined interface capability; and
exchanging, by second processing circuitry, data with a target through the first processing circuitry.

21. A communication device, comprising:
second processing circuitry configured to exchange data with a target through first processing circuitry,
wherein the first processing circuitry is configured to receive a command, to select a predetermined interface capability from among a plurality of interface capabilities based on the command, and to exchange data with the second processing circuitry based on the predetermined interface capability.

22. The communication device according to claim 21, wherein the predetermined interface capability is selected based on an RF protocol used in a communication between the target and the first processing circuitry.

23. The communication device according to claim 22, wherein the first processing circuitry is further configured to transmit a second command and to receive a third command in response to the second command, the third command indicating the RF protocol.

24. The communication device according to claim 23, wherein the first processing circuitry is further configured to receive from the second processing circuitry a fourth command, the fourth command associating the RF protocol with the predetermined interface capability.

25. The communication device according to claim 23, wherein the first processing circuitry is further configured to send a fifth command based on the first command, the fifth command indicating the predetermined interface capability.

26. The communication device according to claim 25, wherein the first processing circuitry is further configured to start and execute an application based on the predetermined interface capability, the application being configured to exchange data between the second processing circuitry and the target using the RF protocol.

27. The communication device according to claim 22, wherein the first processing circuitry is further configured to receive a second command, to send a third command in response to the second command, and to receive the first command based on the third command.

28. The communication device according to claim 27, wherein the first processing circuitry is further configured to receive from the second processing circuitry a fourth command, the fourth command associating the RF protocol with the predetermined interface capability.

29. The communication device according to claim 28, wherein the first processing circuitry is further configured to send a fifth command in response to the first command, the fifth command indicating the predetermined interface capability.

30. The communication device according to claim 29, wherein the first processing circuitry is further configured to start and execute an application based on the predetermined interface capability, the application being configured to exchange data between the second processing circuitry and the target using the RF protocol.

31. The communication device according to claim 21, wherein the predetermined interface capability is selected based on an RF technology used in a communication between the target and the first processing circuitry.

32. The communication device according to claim 31, wherein the first processing circuitry is further configured to transmit a second command and to receive a third command in response to the second command, the third command indicating the RF technology.

33. The communication device according to claim 32, wherein the first processing circuitry is further configured to transmit a fourth command to the second processing circuitry, the fourth command indicating the RF technology.

34. The communication device according to claim 33, wherein the first processing circuitry is further configured to start and execute an application based on the predetermined interface capability, the application being configured to exchange data between the first processing circuitry and the target using the RF technology.

35. The communication device according to claim 31, wherein the first processing circuitry is further configured to receive a second command, to send a third command in response to the second command, and to receive the first command based on the third command.

36. The communication device according to claim 35, wherein the first processing circuitry is further configured to send a fourth command in response to the first command, the fourth command indicating the predetermined interface capability.

37. The communication device according to claim 21, wherein the first processing circuitry is further configured to receive a second command representing a version of the second processing circuitry, the first processing circuitry is further configured to transmit a third command in response to the second command, the third command representing a version of the first processing circuitry, and, when the version of the second processing circuitry is equivalent or higher than the version of the first processing circuitry, the first processing circuitry and the second processing circuitry exchange messages.

38. The communication device according to claim 37, wherein the third command also represents the predetermined interface capability, and, when the version of the second processing circuitry is equivalent or higher than the version of the first processing circuitry, the second processing circuitry transmits a fourth command, the fourth command indicating at least one of a poll mode and a listen mode, an RF protocol, and an interface capability.

39. A communication method, comprising:
  exchanging, by second processing circuitry, data with a target through first processing circuitry;
  receiving, by the first processing circuitry, a first command to select a predetermined interface capability from among a plurality of interface capabilities based on the first command; and
  exchanging, with the second processing circuitry, data based on the predetermined interface capability.

40. A non-transitory, computer-readable storage medium encoded with computer executable instructions, wherein the instructions, when executed by a communication device, cause the communication device to perform a method comprising:
  exchanging, by second processing circuitry, data with a target through first processing circuitry;
  receiving, by the first processing circuitry, a first command to select a predetermined interface capability from among a plurality of interface capabilities based on the first command; and
  exchanging, with the second processing circuitry, data based on the predetermined interface capability.

* * * * *